(12) United States Patent
Leiva Letelier

(10) Patent No.: US 11,338,728 B2
(45) Date of Patent: May 24, 2022

(54) ELECTRONIC DEVICE FOR INSTALLATION IN A MOTORIZED VEHICLE THAT WARNS OF ACCELERATION OR DECELERATION

(71) Applicant: Daniel Leiva Letelier, Talca (CL)

(72) Inventor: Daniel Leiva Letelier, Talca (CL)

( * ) Notice: Subject to any disclaimer, the term of this patent is extended or adjusted under 35 U.S.C. 154(b) by 0 days.

(21) Appl. No.: 17/256,168

(22) PCT Filed: Jun. 24, 2019

(86) PCT No.: PCT/CL2019/000025
§ 371 (c)(1),
(2) Date: Dec. 24, 2020

(87) PCT Pub. No.: WO2020/000116
PCT Pub. Date: Jan. 2, 2020

(65) Prior Publication Data
US 2021/0268958 A1    Sep. 2, 2021

(30) Foreign Application Priority Data

Jun. 26, 2018  (CL) .................................... 1748-2018

(51) Int. Cl.
*B60Q 1/44* (2006.01)
*H05B 47/115* (2020.01)
*B60Q 1/54* (2006.01)

(52) U.S. Cl.
CPC .............. *B60Q 1/444* (2013.01); *B60Q 1/54* (2013.01); *H05B 47/115* (2020.01)

(58) Field of Classification Search
CPC . B60Q 1/444; B60Q 1/54; B60Q 1/22; H05B 47/115; G08B 5/38
See application file for complete search history.

(56) References Cited

U.S. PATENT DOCUMENTS

| | | | |
|---|---|---|---|
| 6,020,814 A * | 2/2000 | Robert | B60Q 1/444 307/10.8 |
| 6,535,113 B1 * | 3/2003 | Gravolin | B60Q 11/007 307/10.8 |
| 7,002,460 B2 | 2/2006 | Bolander et al. | |
| 8,144,004 B2 | 3/2012 | Polak et al. | |
| 2003/0039123 A1 * | 2/2003 | Crisick | B60Q 1/444 362/464 |
| 2004/0032324 A1 | 2/2004 | Otani | |
| 2014/0049976 A1 * | 2/2014 | Leason | B60Q 1/50 362/541 |
| 2017/0368988 A1 | 12/2017 | Ault | |
| 2018/0009372 A1 | 1/2018 | Hammock | |
| 2019/0217769 A1 * | 7/2019 | Nekic | B60Q 1/38 |
| 2019/0248278 A1 * | 8/2019 | Salter | F21S 43/247 |

FOREIGN PATENT DOCUMENTS

| | | |
|---|---|---|
| WO | 2016133251 A1 | 8/2016 |
| WO | 2018045730 A1 | 3/2018 |

* cited by examiner

*Primary Examiner* — Renan Luque
(74) *Attorney, Agent, or Firm* — Hoglund & Pamias, PSC; Roberto J Rios

(57) ABSTRACT

Electronic device comprising an electronic circuit that receives signals from a sensor and which are processed by a microcontroller, such that if an increase or decrease of time is detected between the signals sent by the sensor, they will be interpreted as an acceleration or deceleration respectively, being activated the acceleration or deceleration lighting devices as appropriate.

6 Claims, 2 Drawing Sheets

ELECTRONIC DEVICE FOR INSTALLATION IN A MOTORIZED VEHICLE THAT WARNS OF ACCELERATION OR DECELERATION

TECHNICAL FIELD

The present patent application is directed to a device formed by a set of electronic components concatenated among themselves, and that when connected to a sensor that emits signals per unit of time, it will be possible to determine if a vehicle increases or decreases its linear or turning speed. There may be several uses that can be given to this device, however, as an example, road safety is becoming more complex every day, and not exempt from road accidents, is directly related to the thriving automotive industry, and since it does not exist in motorized vehicles some sign that warns that the motorized vehicle is decreasing or increasing speed, this invention is novel, and from now on almost essential and this is the great opportunity to incorporate them into motorized vehicles in the field of warning signaling to the driver behind, through a lighting system, which alerts us if the vehicle in front is accelerating or decelerating.

In the automotive industry its main objective is: "Reduce rear-end accidents"

When every driver notices that a light signal switches on at the rear of the vehicle in front of him, he instinctively stops applying pressure on the accelerator, as he insights that this light is a warning sign and that the vehicle in front can begin to brake. From that moment, the driver who noticed the flashing light has additional time to perform the braking maneuver as well as a greater stopping distance, reducing the possibility of colliding, thus avoiding the consequences that a rear-end collision entails, such as: deaths, psychological damage, material damage, including people, the state, insurance companies, etc.

BRIEF DESCRIPTION OF THE DRAWINGS

This application contains two figures.

DESCRIPTION OF THE INVENTION

Figure 1:
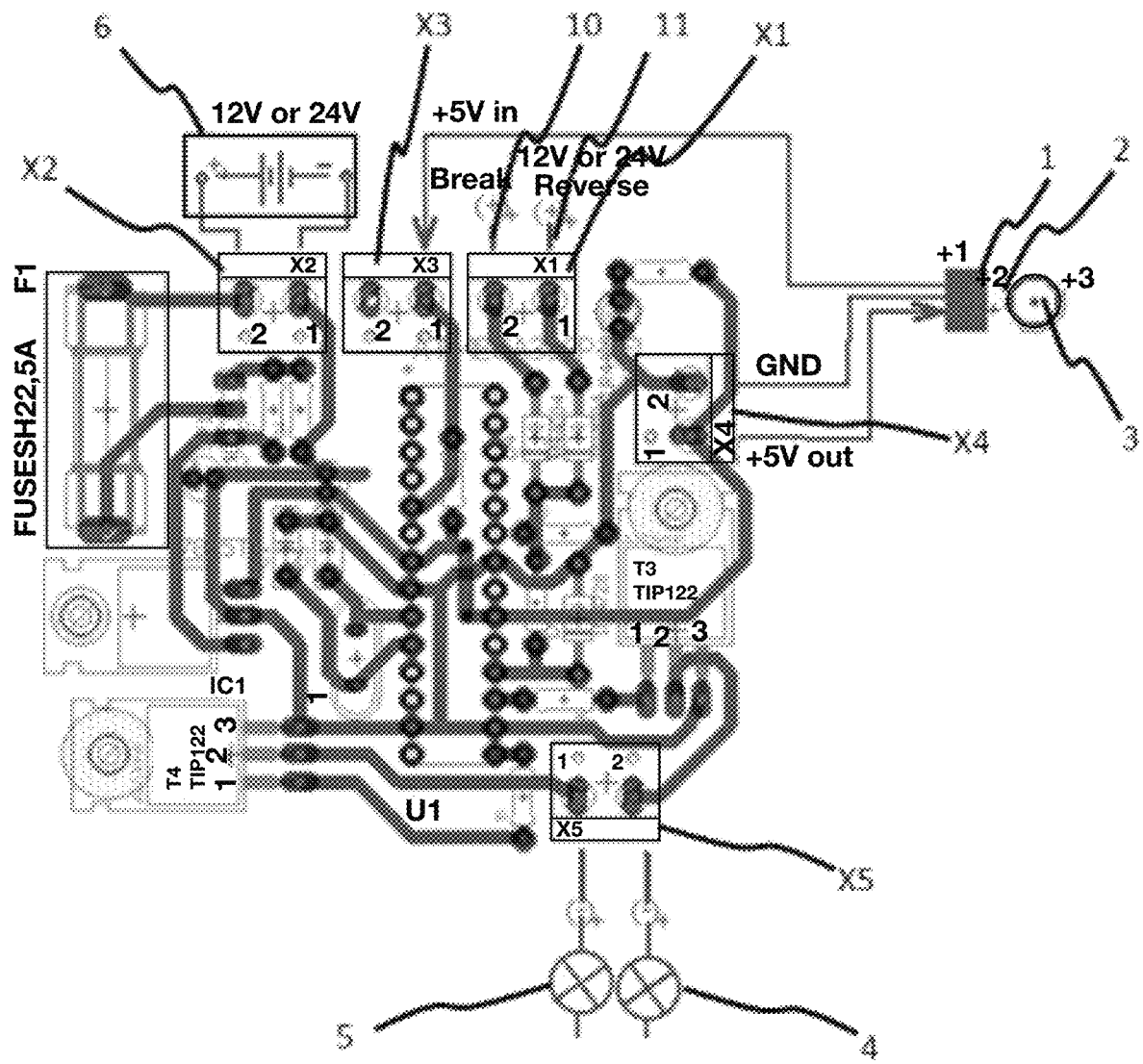
FIG. 1 shows the BOARD with the location and connection of the peripherals.
Figure 2:
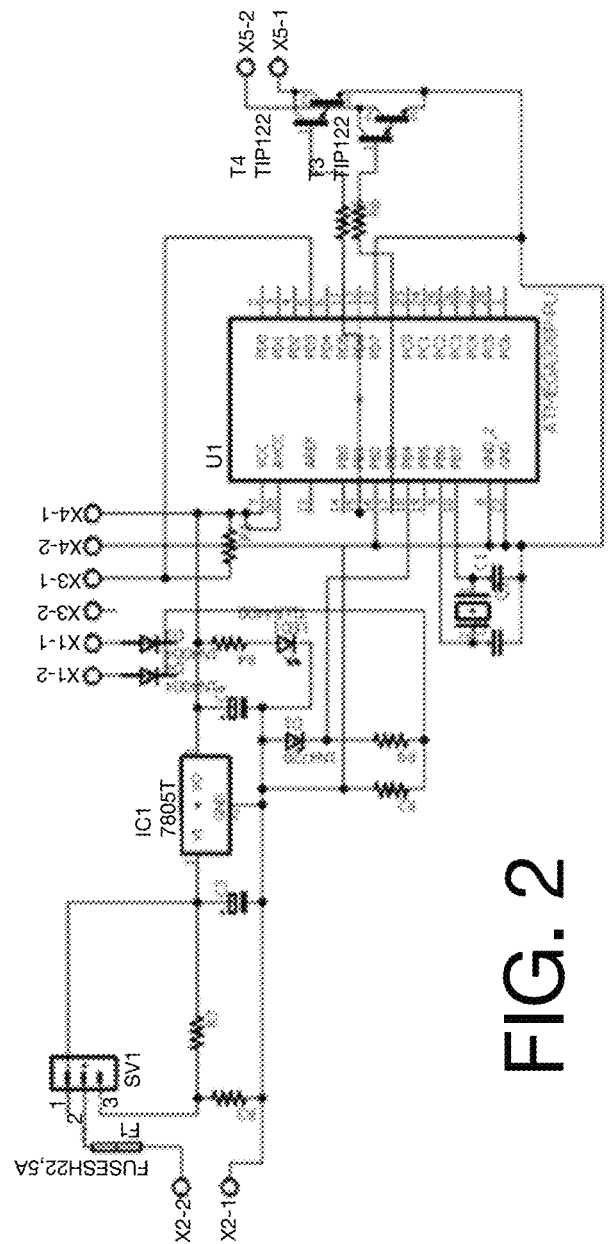
FIG. 2 shows a SCHEMATIC DESIGN.

Peripheral Connections to the Board (FIG. 1/2) Board Supply:
The positive supply (+) of the board is made by connecting it to a 12- or 24-volt direct current power source (6) through pin (2) of the Screw (X2) terminal.
To pin (1) of the Screw (X2) terminal, connect GND
Sensor to Board Connection:
The supply (+) of the sensor is connected to the board through pin (1) of the Screw (X4) terminal.
The ground (−) of the sensor is connected to the board through pin (2) of the Screw (X4) terminal.
The signal (+) sent by the sensor is connected to the board through pin (1) of the Screw (X3) terminal.
Brake (+) and Reversing (+) Light Connection of the Vehicle:
The positive wire (+) of the vehicle's brake light is connected to pin (2) of the Screw (X1) terminal, Although this device is independent of the analog system of the brake lights, if the positive wire of the vehicle's brake light (10) is connected to pin (2) of the Screw (X1) terminal, allows on slopes (descents), if the vehicle increases its speed, despite that the driver slightly presses the brake, acceleration lights (4) will turn off, and deceleration lights (5) and analog brake lights will turn on simultaneously.

The positive wire (+) of the vehicle's reversing light is connected to pin (1) of the Screw (X1) terminal. If the positive wire (+) of the vehicle's reversing light (11) is connected to pin (1) of the Screw (X1) terminal, it allows that every time the vehicle is reversing, the deceleration light (5) connected to pin (1) of the Screw (X5) terminal turns on, deactivating the acceleration light (4) in order not to confuse any approaching driver when seeing that the vehicle is performing the reverse maneuver.

Connection of the Acceleration (4) and Deceleration (5) Lights to the Board:
The negative wire (−), of the deceleration lights (5) are connected to pin (1) of the Screw (X5) terminal.
The negative wire (−), of the acceleration lights (4) connected to pin (2) of the Screw (X5) terminal.
Operation: (FIG. 1)
The process is originated by a sensor (1), which is activated when a magnet (2) approaches, inserted in a rotating mechanism (3) and which is directly related to the movement of the vehicle. These signals are connected through pin (1) of the Screw (X3) terminal, to a microcontroller (FIG. 1).

A program inserted in the microcontroller receives these digital signals processing them, and if the magnet (2) remains static or at a constant rotational speed and no large time variations are detected in the signals sent by the sensor (1), no signal will be activated to indicate whether the vehicle increases or decreases its speed. On the contrary, if the microcontroller detects significant increases or decreases in time between the signals sent by the sensor (1), they will be interpreted as deceleration or acceleration respectively. The processed signals are delivered to pin (2) of the Screw (X5) terminal, or to pin (1) of the Screw (X5) terminal, and to these are connected the lighting devices that indicate if the mobile is accelerating or decelerating respectively.

Problem Detection and Usage Exemplification:
In Chile, according to the National Traffic Safety Commission (CONASET) there was a no inconsiderable number of rear-end collisions, described in the following table, data are missing from 2016 and 2017.

| | Cause (CONASET) | | | | | |
|---|---|---|---|---|---|---|
| Year | Accidents | Deceased | Serious | Less Serious | Slight | Total Injured |
| 2010 Total | 7,468 | 137 | 496 | 433 | 5,429 | 6,358 |
| 2011 Total | 7,953 | 114 | 565 | 438 | 5,489 | 6,492 |
| 2012 Total | 7,682 | 117 | 551 | 363 | 5,271 | 6,185 |
| 2013 Total | 9,088 | 126 | 549 | 380 | 5,700 | 6,629 |
| 2014 Total | 9,547 | 115 | 518 | 367 | 5,766 | 6,651 |
| 2015 Total | 10,529 | 131 | 580 | 335 | 5,747 | 6,662 |
| Grand Total | 52,267 | 740 | 3,259 | 2,316 | 33,402 | 38,977 |

During the movement of a vehicle there are three situations to consider according to its movement:
Increasing velocity. Both on steep slopes (descents), or when the driver gives the vehicle a constant acceleration, the negative wire (−), of the acceleration lights (5) connected to pin (2) of the Screw (X5) terminal, they turn on, communicating to the driver behind, that the vehicle in front is accelerating and is apparently not dangerous.

Constant velocity. When the vehicle manages to maintain a relatively uniform speed, the acceleration lights (4) connected to pin (2) of the Screw (X5) terminal, or deceleration lights (5) connected to the pin (1) of the Screw (X5) terminal, they turn off, waiting for a new signal about the increase or decrease in vehicle speed, to activate the lights, as appropriate.

Deceleration. In the event of any decrease in speed, the deceleration lights (5) connected to pin (1) of the Screw (X5) terminal, are activated and it enters to fulfill its most important function, which is to warn (by flashing) the driver behind, to take appropriate action and avoid a rear-end collision.

Of these three considerations, the last one is the one that receives the most attention, due to the degree of danger it entails for the vehicle behind each time the driver of the vehicle in front it has to slow down for some reason. According to this, the deceleration lights will provide valuable information to the driver behind, increasing the time available to react in the face of a change in the speed of his predecessor, thus avoiding a collision, because "the distance available for braking will increase, reducing the possibility from a rear-end collision", therefore the advantage compared to the third brake light is evident.

In addition, these additional light signals will increase the attention and concentration of the driver behind while driving; as mentioned in the study by the psychologist John Voevodsky ((1974), "Evaluation of a deceleration warning light for reducing rear-end automobile collisions", "Journal of Applied Psychology", 59, 270-273) who developed the third brake light, as part of an experiment that consisted of drawing the attention of drivers when the vehicle in front brakes. The experiment showed that vehicles equipped with a third brake light had suffered 60 percent fewer rear-end accidents than the control group. How much more obvious are the deceleration lights that practically guess the driver's reactions to activate?

Currently, vehicles, in their rear area, have only one brake light circuit, all of them being connected to the same electrical circuit and if this fails, the vehicle is left without a brake warning light signal. Well, the deceleration light (5) connected to this electronic device for which we are applying for a patent, comes to solve this flaw, since it works with an electrical circuit completely independent of the conventional brake lights, and can replace or become supplementary to the third brake light, as both circuits are unlikely to fail simultaneously.

The deceleration lights (5) are independent of any driver intervention and are activated only when the sensor detects a slight decrease in vehicle speed, deactivating when the new speed of the same increases or remains steady.

On a relatively horizontal road it is possible to maintain a constant speed, however, on a road with a gradient (uphill) the vehicle begins to slow down, as a result of gravity and other variables, without any signal warning the driver behind, that the vehicle in front is slowing down, even though the driver is pressing the accelerator, and in some cases a rear-end crash may occur. However, if the vehicle in front is provided with this invention, the deceleration lights will be activated and the driver behind may take the corresponding safeguards.

On a steep road (descent), vehicles tend to increase their speed as a result of gravity, unless the driver using the brake pedal tries to maintain a constant speed; and if the analog brake lights are connected to pin (2) of the Screw (X1) terminal, they will act simultaneously with the deceleration lights (5) connected to pin (1) of the Screw (X5), however, if the vehicle increases its speed despite the pressure exerted on the brake pedal, acceleration lights will remain disconnected unless the driver release pressure on the brake pedal.

This invention will be of greater benefit especially at night since the brain, having no reference point of comparison, finds it more difficult to compare if the vehicle in front is decelerating unless the driver put on the brake pedal.

We found a no inconsiderable number of trucks and buses that use the "engine brake", retarder that helps to slow down without using the service brakes, and therefore there is no sign to indicate that it is slowing down.

Both the color of the peripheral lights, as well as the flashing of the same, that could be connected, to this invention, will be subject to international or national organizations such as, in Chile, the Ministry of Transport and Telecommunications so that they set under which parameters they must or they can work, and therefore are not part of this application.

It is known that when installing new technologies, manufacturers of new vehicles will incorporate a section in the vehicle manual where the characteristics of the advances are indicated; so that the owner take into account this technology especially if it is related to security.

For a person with basic knowledge of automotive electricity, it is very easy to install this system of lights (acceleration or deceleration), for vehicles that do not have this technology and wish to include an additional security system consider:

Comparative Advantages:
1. Can be installed on heavy-duty, light-duty vehicles and motorcycles
2. Completely independent of analog or digital speedometers.
3. There is no connection with the GPS system.
4. Independent if the driver has hearing impairment or decreased, as other systems require it.

List of Components that Make Up the Board

| | | |
|---|---|---|
| X1-1 | Screw Terminal (2-pin) | in signal 12 V Reverse |
| X1-2 | | in signal 12 V Brake |
| X2-1 | Screw Terminal (2-pin) | GND |
| X2-2 | | in 12 V |
| X3-1 | Screw Terminal (2-pin) | in signal 5 V Hall Sensor |
| X3-2 | | |
| X4-1 | Screw Terminal (2-pin) | out 5 V [Hall Sensor] |
| X4-2 | | GND [Hall Sensor] |
| X5-1 | Screw Terminal (2-pin) | (-) Light 1 |
| X5-2 | | (-) Light 2 |
| F1 | 1 A Fuse | |
| SV1 | Pin Header | |
| R1 | 10KΩ Resistor | |
| R2 | 10KΩ Resistor | |
| R3 | 10KΩ Resistor | |
| R4 | 330Ω Resistor | |
| R5 | 2.2KΩ Resistor | |
| R6 | 2.2KΩ Resistor | |
| R7 | 10KΩ Resistor | |
| R9 | 10KΩ Resistor | |
| IC17805T | Voltage regulator LM7805 | |
| D1 | 5.1V Zener Diode | |
| D3 | Rectifier Diode 1n4007 | |
| D4 | Rectifier Diode 1n4007 | |
| LED1 | LED diode | |
| C1 | 22pF Capacitor | |
| C3 | 1 μF Electrolytic Capacitor | |
| C4 | 10 μF Electrolytic Capacitor | |
| C5 | 22pF Capacitor | |
| Q1 | 16 MHz Crystal Oscillator | |
| U1 | Microcontroller Atmega 328P-PU | |
| T3 | TIP 122 NPN Transistor | |
| T4 | TIP 122 NPN Transistor | |
| 1 | Sensor | |
| 2 | Magnet | |
| 3 | Rotating Mechanism | |

-continued

| | |
|---|---|
| 4 | Acceleration Light |
| 5 | Deceleration Light |
| 6 | Battery; DC Power Source |
| 10 | Positive Wire of the Brake Light |
| 11 | Positive wire of the Reversing Light |

According to an embodiment of the present invention, an electronic device is installed in motorized vehicles and connected to a system of lights attached to the rear of the vehicle allow, by a flash of light, warn every driver behind this vehicle on its acceleration or deceleration, achieving to reduce the rear-end road accidents, it consists of several ports to which peripherals can be connected according to needs, one of these predefined terminals or ports receives the signals from an external sensor (1), which is activated when a magnet (2) approaches, inserted in a rotating mechanism (3), and which is directly related to the movement of a vehicle, the signals from the sensor are connected by a wire to pin 1 of the Screw (X3) terminal, the which are sent to a microprocessor; the sensor supply is connected to pin 1 of the Screw (X4) terminal, and the sensor ground is connected to pin 2 of the Screw (X4) terminal, if the program inserted in the microprocessor detects increase or decrease in time between the signals sent by the sensor (1), will be interpreted as deceleration or acceleration respectively; once the time variations between the signals captured by the sensor (1) have been processed, the acceleration signal is sent to pin 2 of the Screw (X5) terminal or deceleration to pin 1 of the Screw (X5) terminal, and to these are connected the acceleration or deceleration lighting devices respectively; if the magnet (2), located in the rotating mechanism (3), remains static or at a constant rotational speed and if the program inserted in the microprocessor does not detect large time variations between the signals sent by the sensor (1), no light signal will be activated; the positive wire (+), of the reversing light is connected to pin 1 of the Screw (X1) terminal, this allows that each time the vehicle is reversing, the deceleration light connected to pin 1 of the Screw (X5) terminal turns on, deactivating the acceleration light in order not to confuse any approaching driver when seeing that the vehicle is performing the speed increase maneuver in reverse, the positive wire (+) of the brake light is connected to pin 2 of the Screw (X1) terminal, this allows on slopes (descents), if the vehicle increases its speed, despite that the driver slightly presses the brake, acceleration lights, will turn off, and deceleration lights and analog brake lights will turn on simultaneously, the positive supply (+) of the board is made by connecting it to a 12 or 24 volt direct current power source through pin 2 of the Screw (X2) terminal, GND is connected to pin 1 of the Screw (X1) terminal. The choice of 12 or 24 volt of board operating voltage is made by a Slide Switch.

The device is a circuit of electronic elements that can be used with 12- or 24-volt direct current batteries.

The device sends direct current signals to a terminal where a circuit of lights of a predetermined color can be connected and that turn on every time the vehicle increases or decreases its speed.

The device is an electronic invention that connected to a circuit of lights turns on every time the vehicle is reversing, it turns on the deceleration lights.

The device is characterized in that the acceleration or deceleration lights connected to the board do not turn on when the vehicle carrying this invention maintains a constant speed or is at rest.

The device is a circuit in which the lights connected to the board are independent of the brake lights.

The device is characterized in that when the vehicle stops the deceleration lights connected to the board remain on for a short time, disconnecting automatically and independently if the driver is pressing the brake.

The device has a voltage selector, which allows selecting the power source that can be 12 or 24 volts.

The device is such that the flashing of the lights connected to the board are independent of any intervention by the driver and are activated only when the sensor detects a slight variation in speed of time.

The device is usable in any type of static machinery or motorized vehicles, both heavy-duty, light-duty and/or motorcycles that it is desirable to know if its linear or rotational speed increases or decreases.

The device, is such that the lighting components connected to the board and attached to the rear of motorized vehicles, attract the attention of drivers on the road while driving.

The invention claimed is:

1. A safety device for vehicles that includes lighting devices independent of the conventional brake light system, aimed at alerting a driver who is moving behind a vehicle that has the safety device installed with respect to the acceleration or deceleration of the latter, in order to reduce rear-end accidents, where the lighting devices include at least one acceleration light (4) and one deceleration light (5) that are arranged in a visible location at the rear of the vehicle, said safety device comprising:
    a magnet (2) inserted in a rotating mechanism (3) that is related to the movement of a vehicle;
    a sensor (1) configured to be activated when said magnet (2) approaches said sensor (1);
    a microcontroller coupled to the sensor (1) and to a negative wire of at least one acceleration light (4) and a negative wire of at least one deceleration light (5);
    a positive wire of a brake light (10) connected to said microcontroller;
    a positive wire of a reversing light (11) connected to said microcontroller; and
    a voltage selector configured to so that the safety device is used with either 12V or 24V DC batteries.

2. The safety device according to claim 1, wherein said positive wire of a brake light (10) of the vehicle is connected to said microcontroller through a terminal of the safety device.

3. The safety device according to claim 1, wherein said positive wire of a reversing light (11) of the vehicle is connected to said microcontroller through a terminal of the safety device.

4. A method of operating a vehicle safety device that includes lighting devices independent of the conventional brake light system, aimed at alerting a driver who is moving behind a vehicle that has the safety device installed, with respect to the acceleration or deceleration of the latter, in order to reduce rear-end accidents, where the lighting devices include at least one acceleration light (4) and one deceleration light (5) that are arranged in a visible location at the rear of the vehicle, said method comprises the steps of:
    activating a sensor (1) when a magnet (2) inserted in a rotating mechanism (3) approaches said sensor, wherein said rotating mechanism (3) is related to the movement of the vehicle;
    receiving at a microcontroller, signals generated by the sensor (1), a braking signal generated by a vehicle's brake light (10), and a reversing signal generated by a vehicle's reversing light (11), wherein said microcontroller is coupled to said sensor (1), to a positive wire of said brake light (10), and to a positive wire of said reversing light (11);

detecting at said microcontroller an increase or a decrease in a time lapse between the signals generated by the sensor (1) and determining a vehicle acceleration or deceleration based on said detection; and sending from said microcontroller a deceleration signal to a first pin of a Screw (X5) terminal of said safety device connected to a negative wire of at least one deceleration light (5) in order to turn on said at least one deceleration light (5) coupled to said Screw (X5) terminal or sending from said microcontroller an acceleration signal to a second pin of the Screw (X5) terminal of said safety device connected to a negative wire of at least one acceleration light (4) in order to turn on said at least one acceleration light (4) coupled to said Screw (X5) terminal.

5. The method of operating a vehicle safety device according to claim 4, further comprising the step of turning off said at least one acceleration light (4) and turning on said at least one deceleration lights (5) when said vehicle is breaking, wherein a positive wire of said brake light (10) of the vehicle is coupled to the microcontroller of the safety device so that said breaking signal is received at the microcontroller when said vehicle is breaking.

6. The method of operating a vehicle safety device according to claim 4, further comprising the step of turning off said at least one acceleration light (4) and turning on said at least one deceleration lights (5) when said vehicle is reversing, wherein a positive wire of said reversing light (11) of the vehicle is coupled to the microcontroller of the safety device so that said reversing signal is received at the microcontroller when said vehicle is reversing.

* * * * *